United States Patent [19]

Ando et al.

[11] 4,212,500
[45] Jul. 15, 1980

[54] ANTISKID BRAKE CONTROL ARRANGEMENT FOR VEHICLE WHEELS

[75] Inventors: Masamoto Ando; Yoshihisa Nomura, both of Toyotashi; Takaaki Ohta, Okazakishi, all of Japan

[73] Assignees: Aisin Seiki Kabushiki Kaisha; Toyota Jidosha Kogyo Kabushiki, both of Aichi, Japan

[21] Appl. No.: 911,667

[22] Filed: Jun. 1, 1978

[30] Foreign Application Priority Data

Jun. 2, 1977 [JP] Japan .................. 52-65172

[51] Int. Cl.² .................. B60T 8/10; B60T 13/68
[52] U.S. Cl. .................. 303/115; 303/6 C; 303/24 A; 303/24 C; 303/24 F
[58] Field of Search .................. 303/115, 6 C, 24 A, 303/24 C, 24 F, 113, 119

[56] References Cited

U.S. PATENT DOCUMENTS

| | | | |
|---|---|---|---|
| 3,401,987 | 9/1968 | Horvath | 303/115 |
| 4,002,376 | 1/1977 | Kondo | 303/115 |
| 4,095,851 | 6/1978 | Ando | 303/115 |

*Primary Examiner*—Trygve M. Blix
*Assistant Examiner*—Reinhard J. Eisenzopf
*Attorney, Agent, or Firm*—Oblon, Fisher, Spivak, McClelland & Maier

[57] ABSTRACT

This invention relates to a hydraulic pressure control valve arrangement for automotive vehicle wheel brake systems, the latter system comprising a hydraulic master cylinder to be actuated by operating a foot brake pedal, a hydraulic brake pressure control valve assembly provided with a pneumatic servo piston mechanism, and an electromagnetic change-over valve assembly fluidically connected therewith, a skid sensor operatively connected therewith and also with a vehicle wheel, a wheel cylinder mechanism for applying hydraulic braking effort upon vehicle wheels and includes the provision for an inertia responsive valve for additionally controlling the braking fluid pressure reapplication in the wheel cylinders so as to have that reapplication be rapid at first to the fullest extent in accordance with the road coefficient and then becomes gradual.

4 Claims, 3 Drawing Figures

4,212,500

ANTISKID BRAKE CONTROL ARRANGEMENT FOR VEHICLE WHEELS

BACKGROUND OF THE INVENTION

1. Field of the Invention

This invention relates to improvements in and relating to the antiskid brake control arrangement for powered vehicles.

2. Description of the Prior Art

An antiskid brake control arrangement for powered vehicles is intended to increase a resultant braking effect to a possible maximum in accordance with the adhesion coefficient between the wheel and the ground, generally being denoted by $\mu$. The resultant vehicle deceleration by means of the braking operation is consequently proportional to the road coefficient.

There have been known in the art various kinds of brake control arrangements which, in a cycle of brake pressure release and reapplication, suppresses the brake pressure reapplication period of time to a possible minimum in accordance with the road coefficient.

With the conventional brake control arrangement of this kind, the brake pressure is reapplied first rapidly and then gradually so that the antiskid arrangement can have sufficient time to respond and a premature relocking of the wheel is prevented. In order to attain the above objects, the conventional arrangement generally utilizes a vehicle deceleration responsive sensor, such as, for example, a so-to- speak G-sensor, a solenoid valve for allowing a restricted flow of fluid in a servomotor to actuate the antiskid arrangement and a gradual build-up of pressure in brake wheel cylinders, and an electrical circuit which governs the solenoid valve in response to the G-sensor. The provisions parts are considered to be disadvantageous in that they usually cause the entire arrangement to be structurally complicated and expensive.

SUMMARY OF THE INVENTION

It is therefore the main object of the invention to provide an antiskid brake control arrangement for powered vehicles capable of suppressing the pressure reapplication period of time to a possible minimum by reapplying the brake fluid pressure at first rapidly and then gradually with a purely mechanical mode of operation, yet providing a possibility of attaining the shortest possible braking period of time.

With these objects and others in view, the present invention generally comprises a differential servomotor, valve means for permitting of interrupting fluid communication between a brake master cylinder and wheel brake cylinders, means to decrease pressure in the wheel cylinders, means operatively connecting the valve means and the means to decrease pressure in the wheel cylinders to the differential servomotor, computor signal responsive solenoid valve means for controlling the differential servomotor, and inertia responsive valve means for providing additional control to the servomotor for retarding the same to restore the retracted position with throttling resistance thereagainst.

BRIEF DESCRIPTION OF THE DRAWING

Various other objects, feature and attendant advantages of the present invention will be more fully appreciated as the same becomes better understood from the following detailed description when considered in connection with the accompanying drawings in which like reference characters designate like or corresponding parts throughout the several views, and wherein.

DESCRIPTION OF THE PREFERRED EMBODIMENT

Figure 1:
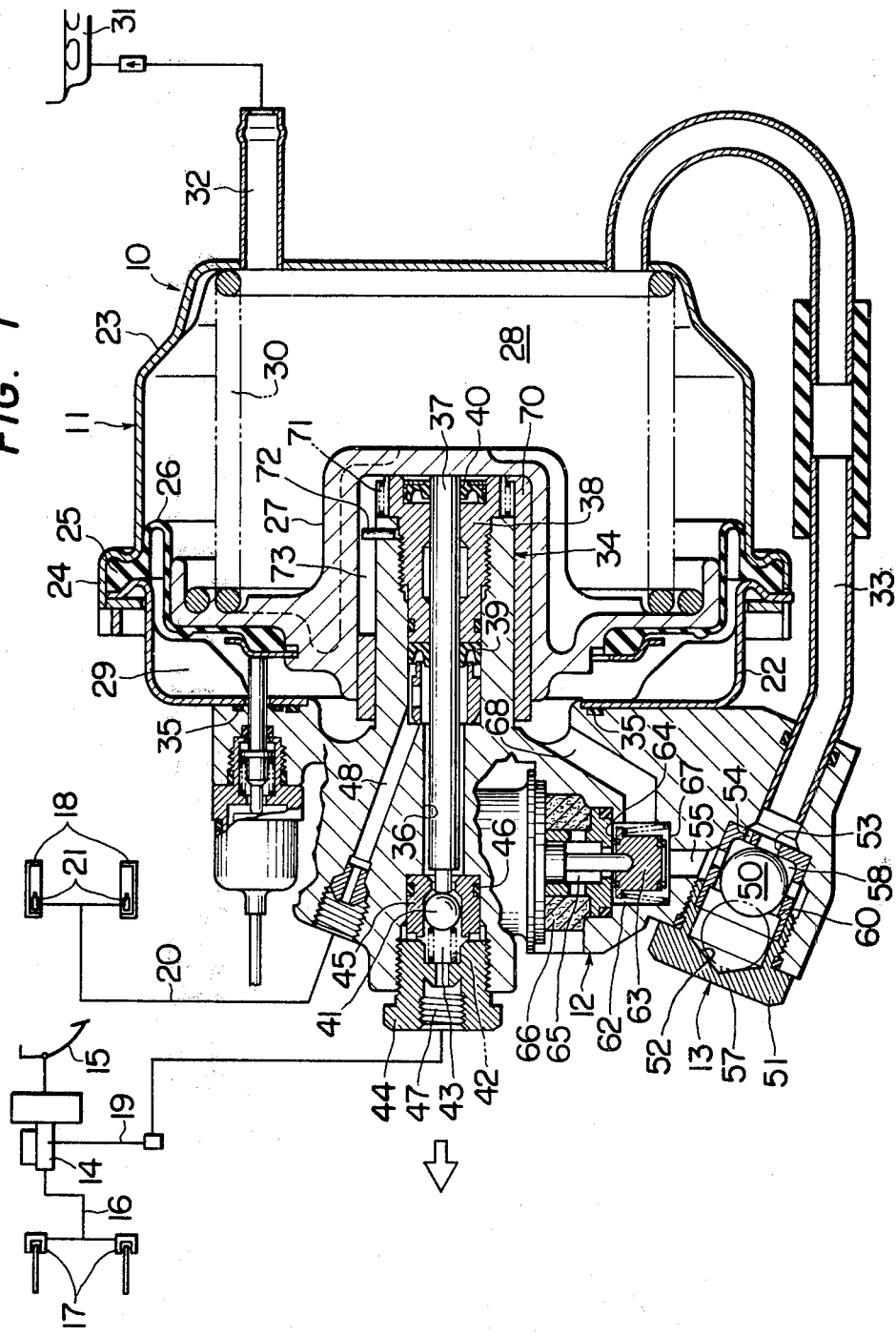
FIG. 1 is a longitudinal cross-sectional view of a preferred embodiment of the brake pressure control arrangement.

With regard to FIG. 1 there is shown a servomotor 10 having a motor housing 11, solenoid valve 12 and an inertia actuatable valve 13 with a so-to-speak G-sensor of a purely mechanical type. The servomotor 10 is in fluid communication as described below with a master cylinder 14 that is mounted in a vehicle so as to be operatable by a brake pedal 15. The master cylinder 14, as thus located, provides braking pressures via conduits 16 and 19 to front wheel disc brake actuators 17 and the servomotor 10 which is connected by a conduit 20 to a wheel cylinder 21 for the rear drum brakes 18, respectively. With particular regard now to the axial cross sectional view in FIG. 1, the housing 11 is more clearly depicted as including a front shell 22 and a rear shell 23 joined, as by twist lock assembly 24, with a peripheral bead 25 of a rubber rolling diaphragm 26 interposed for sealing the juncture of the shells. The diaphragm 26 has at its central portion a movable wall 27 or power piston sealed thereto. The diaphragm and the wall cooperate to divide the housing interior into two chambers 28 and 29.

A compressed coiled spring 30 is installed within the rear shell 23 or chamber 28 so that it normally urges the wall member 27 to the left when installed. The chamber 28 is in communication through an inlet 32 with an engine intake manifold 31 and also in communication through a conduit 33 with the check valve 13. The shell 22 has a hub assembly 34 sealingly secured to the outside of the shell 22 by means of sealing member 35 thereby sealing the same against fluid flow between the outside and inside of the chamber 29.

On the hub assembly 34 is slidably supported the movable wall member 27. Axial support for the movable wall 27 is occasioned by the cylindrically projecting hub assembly 34 that extends into the chamber 29. The hub assembly 34 includes bore 36 for the receipt of a rod or plunger 37 which is in slidable and sealing engagement with a plug 38 by means of cup seal members 39 and 40 preventing hydraulic fluid flow out of the bore 36 into the chamber 28. The rod or plunger 37 is normally at its left end in abutting relation with a ball 41 by means of a compressed coil spring 42 in a chamber 43 with its left end anchored to a plug 44 and its right end anchored to the ball. The plug 44 is threaded to be screwed into a tapped bore of the body of the hub assembly 34 for retaining a seat member 45 between the plug 44 and the bottom end of the bore in sealed relation with the bore by means of seal member 46 to prevent fluid flow along the periphery of the seat member 45.

The chamber 43 is connected through a port 47 and conduit 19 to the master cylinder 14. The bore 36 is in communication through a passage 48 and conduit 20 with the wheel cylinder 21 of the rear brakes 18.

The check valve member 13 has a bore 52 for retaining a ball valve 50 therein in cooperation with a plug 51 which is screwed into a tapped portion of the bore, chamber or cavity 52. The bore or chamber 52 is in communication through a seat 53 as well as an orifice 54 with the conduit 33. The chamber 52 is further in communication through a passage 55 with the solenoid valve 12. The diametrical size of the ball valve 50 is such that it not only has substantial freedom of movement in the chamber 52 but also allow for the inclusion of compartment separation wall which has a suitable amount fluid flow along the peripheral of the ball 50 between compartments 57 and 58. The internal face of the chamber 52 is formed with an annular step or shoulder 60 which is very important in obtaining the desired result of the invention as is clear from the description hereinabove.

The solenoid valve 12 has a valve chamber 62 in which is disposed a double acting valve member 63 normally spring biased toward engagement with an upper seat 64. The chamber 62 is in communication through the upper seat 64, a cavity 65 and a filter 66 with atmosphere. The chamber 62 is further in communication through a seat 67, and passage 55 with the chamber 52 of the check valve 13. The chamber 62 is still further in communication through a passage 68 with the chamber 29.

From the foregoing description, it will be apparent that the movable wall 27 reciprocates within the housing 11 in sliding engagement with the hub assembly 34 as a result of a pressure differential applied to opposite sides of movable wall 27 as will be described in greater detail hereinabove. A sleeve member 70 is slidably mounted on the hubassembly and wall 27 is slidably supported on the the sleeve. A coiled compression spring 71 normally urges the sleeve 70 to move to the right so that, when the wall 27 moves to the right, expansion of the sleeve takes place so as to provide a longer distance for guiding for the wall 27. The sleeve 70 has an axial slit 73 in which is closely slidably fit a guiding pin 72 projecting from hub assembly 34.

Operation

The movable wall 27 of piston and all other parts are retained in the positions shown in FIG. 1 of the drawings in the normally retracted position of the servomotor.

In these positions, fluid pressure developed in the master cylinder 14 is transmitted through conduit 16 directly to front wheel disc brake actuators 17 and also to the rear wheel cylinders 21 through conduit 19, port 47, chamber 43, seat 45 in opened position, chamber 36, passage 48 and conduit 20. In the condition, the chambers 28 and 29 in the housing 11 are in fluid communication with each other through conduit 33, orifice 54, chamber 58, conduit 55, seat 67, chamber 62, and passage 68 so that wall member 27 is retained in the position shown by means of the compression spring 30.

Whenever the braking pressure which develops in the rear wheel cylinder 21 begins to approach a value that will lock the brake drums of the rear wheel brakes 18, the sensor (not shown) will cause the computer system (not shown) to provide an energizing signal to the solenoid valve 12 and pull the double acting valve 63 onto seat 67 and become unseated from seat 64. This terminates the communication between chambers 28 and 29. Air is accordingly admitted into chamber 29 through air filter 66, seat 64, chamber 62 and passage 68. Air entering the chamber 29 through the solenoid valve 12 creates an unbalanced force across the diaphragm 26, which forces diaphragm 26 and wall member 27 together to the right against its biasing spring 30 to a new equilbrium position. Rod 37 is normally urged by fluid pressure in the chamber 36 to the right and extends through seat 45 to abut valve ball 41. With diaphragm 26 all the way to the right corresponding to signal repitition rate, valve ball 41 is seated to the seat 45 interrupting communication of hrdraulic brake fluid from the master cylinder 14 through valve seat 45, chamber 36, passage 48 and conduit 20 to the wheel cylinder 21.

As the pulse or signal repitition rate increases, diaphragm 26 moves to the right to a new equilibrium position, thereby moving the rod 36 to the right and allowing spring 42 to force ball 41 against seat 45, thereby isolating the master cylinder 14 from the wheel cylinders 21 and trapping fluid pressure in the wheel cylinders 21. As the pulse rate increases still further, diaphragm 26 moves further to the right, carrying the rod 37 to the right. Chamber 36, whose right edge is defined by gasket or seal 39 increases in volume causing the hydraulic fluid pressure trapped in the wheel cylinders 21 to be attenuated. At the maximum pulse repetition rate, diaphragm 26 has moved as far to the right as possible and the volume of chamber 36 has increased to the point where the fluid pressure in the wheel cylinder has been completely relieved and the brake released. Of course, as the pulse repetition rate now decreases, the diaphragm returns to the left first forcing the hydraulic fluid back into the wheel cylinders 21 and finally, when the pulse repetition rate has decreased sufficiently, lifting ball 41 from seat 45 to once again permit free communication from the master cylinder 14 to the wheel cylinders 21. It can thus be seen that brake pressure is related to wheel deceleration, being proportional to wheel deceleration in a critical range of wheel deceleration.

The weight of the ball valve 50 is so calculated in design that it is held in the position shown when the resultant vehicle deceleration does not reach a predetermined threshold value. Should the deceleration increase over the predetermined value, an inertial force developed in the ball will force ball from seat 53 and allow additional flow of air through seat 53. It will be noted that in the opened position of the ball 50, violent flow of air is permitted through the check valve 13 so that residual pressure in chamber 29 can be trapped rapidly and in closed position of the ball with a gradual fluid flow through orifice 54 and hence a gradual trapping of the pressure in chamber 29 is allowed.

From the foregoing it will be noted that the rapid trapping of the pressure in chamber 29 will result in a rapid reapplication of pressure in wheel cylinders 21 while the slow trapping of the pressure in chamber 29 will result in a slow repressurization in wheel cylinders 21.

Figure 2:
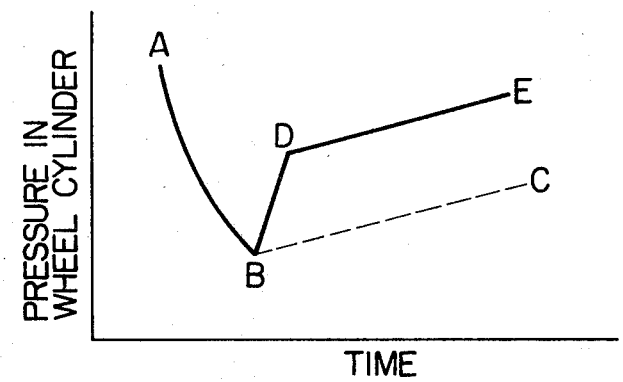
FIG. 2 is a graphical representation wherein the hydraulic wheel cylidner pressure is plotted against time, the full lines representing the inventive arrangement and the dotted lines showing a comparative one which might be presented by the invention when in normal mode of operation.

The above operation is graphically represented in FIG. 2. The pressure in the wheel cylinders 21 decreases as seen by the line A to B. The dotted line B to C represents repressurization in wheel cylinders 21 in the case of the seating position of ball 50, while the solid line B to D represents reapplication in the case of the unseating position of ball 50 until ball 50 moves past the annular step 60 to the right.

The pressure reapplication represented by the line D to E is described hereinabove in greater detail since this principally forms the concept of present invention.

Upon release of the vehicle rear wheel brakes 18, the computer is deactivated and the solenoid valve 12 is deenergized to disengage valve 63 from seat 67 and to engage the opposite seat 64 so that residual atmospheric pressure in chamber 29 is trapped through passage 68, solenoid valve chamber 62, passage 65, check valve 13, and conduit 33 into chamber 28 and thence to the vacuum source 31.

Figure 3:
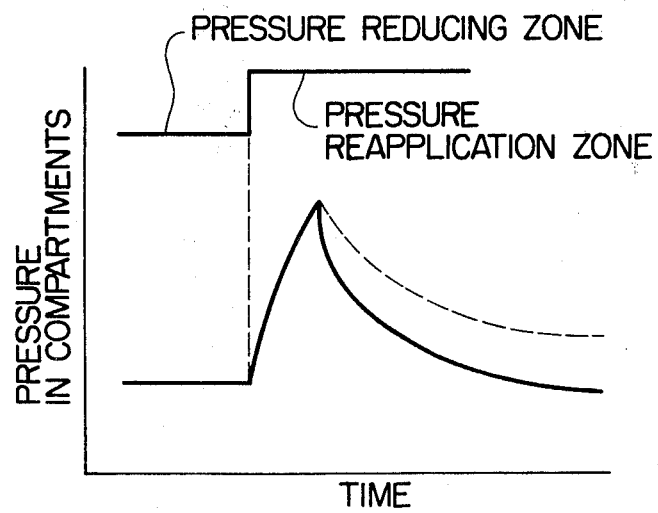
FIG. 3 is another graphical representation, showing a comparative performance chart wherein pressures in a check valve are plotted against time, the full lines partially representing pressure in one compartment in the ckeck valve and the dotted line representing pressure in another compartment in the check valve

Immediately after the valve 63 restores the position shown, atmospheric pressure is still momentarily inactive in chamber 29. The residual atmospheric pressure immediately begins to be trapped through the passageway as above described. When the residual atmospheric pressure is being trapped, pressure in the chamber 52 and hence in the two compartments 57 and 58 at first increases and then decreases until the pressure in chamber 29 is such as to nearly balance out with that in chamber 28. At the pressure decreasing stage, the compartment 58 tends to anticipate the other chamber 57 in releasing pressure due to a closer location relative to the outlet seat 53 so that a pressure differential is developed across ball 50 and continues until chambers 29 and 28 balance with each other. When the pressure differential increases to a valve sufficient to force ball 50 past the step 60, ball 50 will engage seat 53. Fluid communication is thereafter restricted only through the orifice 54. FIG. 3 graphically represents the decrease in pressure in the two compartments 57 and 58, wherein the solid line curve represents a decrease in pressure in compartment 58, and dotted line curve represents a decrease in pressure in compartment 57.

From the foregoing, it will be noted that in case of violent braking operation to effect a predetermined vehicle deceleration, the ball 50 occupies the position shwon by the dotted line in FIG. 1 due to its inertial force, thereby allowing rapid restoration of the diaphragm and hence rapid reapplication of pressure in the wheel cylinders 21. Further, it will be understood that the above rapid restoration of the diaphragm and rapid reapplication of pressure terminates when the ball 50 moves to the right past the step 60 and, engages the seat 53 and thereafter, gradual pressure reapplication is allowed to the wheel cylinders 21. The gradual repressurization of wheel cylinders 21 is effective to keep the antiskid system sensitive by allowing for sufficient time to respond, yet providing minimum vehicle stopping distance.

Obviously, many modifications and variations of the present invention are possible in light of the above teachings. It is therefore to be understood that within the scope of the appended claims the invention may be practiced otherwise than as specifically described herein.

What is claimed is:

1. An antiskid brake control system for a plurality of wheels of a wheeled vehicle having brakes actuatable from a fluid source of pressure comprising:
    a control valve assembly located in hydraulic circuit between a hydraulic master cylinder and cylinder means for said wheels, said control valve assembly comprising,
    a diaphragm piston movable within a housing and defining two pneumatic fluid chambers therein;
    an on-off control valve located in said hydraulic circuit for interrupting normal hyrdraulic communication between said master cylinder and said wheel cylinder means;
    hydraulic pressure reducing valve means located in said control valve assembly and adapted to move so as to increase the effective volume of said hydraulic circuit on the wheel cylinder side of said on-off control valve means, said on-off control valve means and said pressure reducing valve means normally being disposed in an inoperative position by said diaphragm piston,
    passage means providing communication between said pneumatic fluid chambers,
    electromagnetic means operably located in said passage means for normally allowing communication between said two pneumatic fluid chambers, said electromagnetic means being responsive to a locked condition of at least one of said wheels upon brake application to close communication between said two pneumatic chambers and admit ambient air to one of said chambers, and
    deceleration responsive and inertia actuatable fluid flow control means located in said passage means, said flow control means being movable in accordance with vehicle deceleration between a first position allowing a relatively rapid flow of fluid through said passage means and a second position allowing a comparatively restricted flow of fluid through said passage means.

2. An antiskid brake control system as set forth in claim 1, said flow control means comprising:
    an orifice member to provide a throttling resistance for flow of fluid within flow control means,
    an inertia responsive and pressure differential responsive ball valve,
    a seat member cooperating with said ball valve, and
    a retarding member to provide resistance to said ball valve in seating movement thereof until the pressure differential acting thereon reaches a predetermined point whereupon said flow control means will move to said second position to allow a restricted flow of fluid through the orifice member so as to provide for a gradual movement of said diaphragm piston and hence a gradual build-up of pressure in said wheel cylinders.

3. An antiskid brake control system as set forth in claim 2, wherein said retarding member includes a cavity formed therein and wherein said cavity contains said ball valve therewithin in a manner such that the ball valve is allowed to freely move therein with a slight clearance formed between the periphery surface of the ball valve and an internal face of said cavity so that said cavity is divided into two volume variable compartments by said ball valve and slight fluid flow is allowed therebetween through said clearance, said two compartments both being normally in communication with one of said chambers in said housing, one of said compartments being in communication through said seat member with the other one of said chambers.

4. An antiskid brake control system as set forth in claim 3, wherein said cavity is in a form elongated in the direction of vehicle travel and inclined through an angle relative to the horizontal plane so that said ball valve is normally urged by its weight toward engagement with said seat member and includes an annular step in the internal face of the cavity so as to provide resistance to the ball valve upon being moved toward engagement with said seat member.

* * * * *